US009288170B2

(12) United States Patent
Ding (10) Patent No.: US 9,288,170 B2
(45) Date of Patent: Mar. 15, 2016

(54) GROUP MESSAGING FOR FACILITATING INTERACTIONS BETWEEN USERS

(71) Applicant: Alibaba Group Holding Limited, George Town (KY)

(72) Inventor: Shaochun Ding, Hangzhou (CN)

(73) Assignee: Alibaba Group Holding Limited (KY)

( * ) Notice: Subject to any disclaimer, the term of this patent is extended or adjusted under 35 U.S.C. 154(b) by 447 days.

(21) Appl. No.: 13/675,338

(22) Filed: Nov. 13, 2012

(65) Prior Publication Data

US 2013/0124651 A1   May 16, 2013

(30) Foreign Application Priority Data

Nov. 16, 2011   (CN) .......................... 2011 1 0363306

(51) Int. Cl.
 *G06F 15/16* (2006.01)
 *H04L 12/58* (2006.01)
 *H04L 29/08* (2006.01)
 *G06F 12/00* (2006.01)

(52) U.S. Cl.
CPC ........ *H04L 51/046* (2013.01); *H04L 29/08072* (2013.01)

(58) Field of Classification Search
USPC ......... 709/203, 206–207, 217–218, 223–229, 709/250
See application file for complete search history.

(56) References Cited

U.S. PATENT DOCUMENTS

| | | | |
|---|---|---|---|
| 5,822,523 A | 10/1998 | Rothschild et al. | |
| 8,301,545 B1 * | 10/2012 | Shah | 705/37 |
| 8,825,769 B2 * | 9/2014 | Zheleva | 709/206 |
| 2005/0102358 A1 | 5/2005 | Gold et al. | |
| 2006/0136590 A1 * | 6/2006 | Barrett et al. | 709/225 |
| 2008/0043935 A1 * | 2/2008 | Liebermann | 379/52 |
| 2009/0094367 A1 | 4/2009 | Song et al. | |
| 2009/0106376 A1 | 4/2009 | Tom et al. | |
| 2010/0071013 A1 * | 3/2010 | Vandermolen et al. | 725/109 |
| 2010/0180217 A1 | 7/2010 | Li | |
| 2011/0072125 A1 * | 3/2011 | Quoc et al. | 709/223 |
| 2011/0276634 A1 | 11/2011 | Maruyama et al. | |
| 2012/0231770 A1 | 9/2012 | Clarke et al. | |
| 2012/0324548 A1 | 12/2012 | Landsman | |
| 2013/0091217 A1 * | 4/2013 | Schneider | 709/204 |

FOREIGN PATENT DOCUMENTS

| | | |
|---|---|---|
| EP | 2081394 | 7/2009 |
| JP | 2001184289 | 7/2001 |
| JP | 2002259420 | 9/2002 |
| JP | 2003281069 | 10/2003 |
| JP | 2008257290 | 10/2008 |
| WO | 2004049737 | 6/2004 |
| WO | 2008154832 | 12/2008 |

OTHER PUBLICATIONS

Hiroko Azuma, "The Net Queen", Mac Fan Beginners, Mar. 1, 2003, vol. 9, No. 3, pp, 140-141.

* cited by examiner

*Primary Examiner* — Zarni Maung
(74) *Attorney, Agent, or Firm* — Van Pelt, Yi & James LLP (57) ABSTRACT

A group messaging relationship establishment method is provided. The method includes determining, by a web server, whether a number of comments relating to information exceeds a predetermined first numerical threshold within a predefined first time period, in response to the number of comments relating to the information exceeding the predetermined first numerical threshold within the predefined first time period, establishing a corresponding instant messaging group relating to the information, and recording a unique identifier information for the instant messaging group relating to the information.

15 Claims, 6 Drawing Sheets

GROUP MESSAGING FOR FACILITATING INTERACTIONS BETWEEN USERS

CROSS REFERENCE TO OTHER APPLICATIONS

This application claims priority to People's Republic of China Patent Application No. 201110363306.X entitled GROUP MESSAGING RELATIONSHIP ESTABLISHMENT AND WEB PAGE DISPLAY METHOD AND RELATED EQUIPMENT filed Nov. 16, 2011 which is incorporated herein by reference for all purposes.

FIELD OF THE INVENTION

This application relates to group messaging to facilitate interactions between users.

BACKGROUND OF THE INVENTION

Many existing information and e-commerce websites have the capability to provide comments relating to certain news stories, topics or products. The comments are displayed in thread lists, and users are able to read the comments relating to the news stories, the topics or the products. However, comments related to a particular news story, topic or product are typically static. Some e-commerce websites allow one-to-one interaction between a buyer and a seller, but the e-commerce websites are typically not able to satisfy the demand for interaction among multiple buyers with respect to the same product. For example, in one scenario, user A wants to buy a certain product on a certain e-commerce website, and is able to review comments from other users on the product in the web pages related to the product. However, the comments related to the product are typically static, and the comments are generally published by other users immediately after purchasing the product. Since user A typically cannot contact other users directly, there is not a way of knowing how the other users feel about the product after they have used the product for a period of time. In another scenario, user B is a member of an information website. After examining a topic of interest to the user, for example, user B may want to gain a better understanding of the topic and begin discussing the topic with other users knowledgeable about this topic. Without knowing who might be interested or knowledgeable about this topic, it would be difficult for user B to contact the other users and engage them in conversation.

News stories, topics and products are all able to attract user interest. Existing web platforms, however, typically do not provide good facilities for initiating real-time discussions between multiple users interested in the same news story, topic or product.

BRIEF DESCRIPTION OF THE DRAWINGS

Various embodiments of the invention are disclosed in the following detailed description and the accompanying drawings.

DETAILED DESCRIPTION

The invention may be implemented in numerous ways, including as a process, an apparatus, a system, a composition of matter, a computer program product embodied on a computer readable storage medium, and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application allows users who read the comments relating to a certain piece of information (e.g., a news story, a topic or a product) to conveniently and quickly establish group messaging relationships with the other users who have published the comments on the same news story, topic or product. Thus, the group of users who are interested in the same topic can conveniently discuss and provide more information relating to a common news story, topic or product. Previously, if a user who has reviewed the comments relating to a certain news story, topic or product wants to communicate with users who have published comments on the same news story, topic or product, the user must undertake a series of complex operations, including logging on and individually finding and adding each user as a "friend." The complex operations result in a great inconvenience to the user. Furthermore, the complex operations not only utilize a great amount of server resources, but the complex operations also increase network load on the communications network.

In the present application, information includes news stories, topics, or information about products. By integrating comments relating to the information and instant messaging, multiple users interested in the same information are allowed to engage in real-time exchanges using a group messaging method. For example, users who have purchased the same product on an e-commerce website may exchange information more quickly; e-commerce website sellers may centralize their answers to buyers' questions, thus avoiding the problem of having to individually and repeatedly answer similar questions. Also, discussions may be initiated more freely among users interested in the same topic. By establishing a connection between static historical comments and dynamic instant messaging groups, websites can better attract and retain users.

Figure 1:
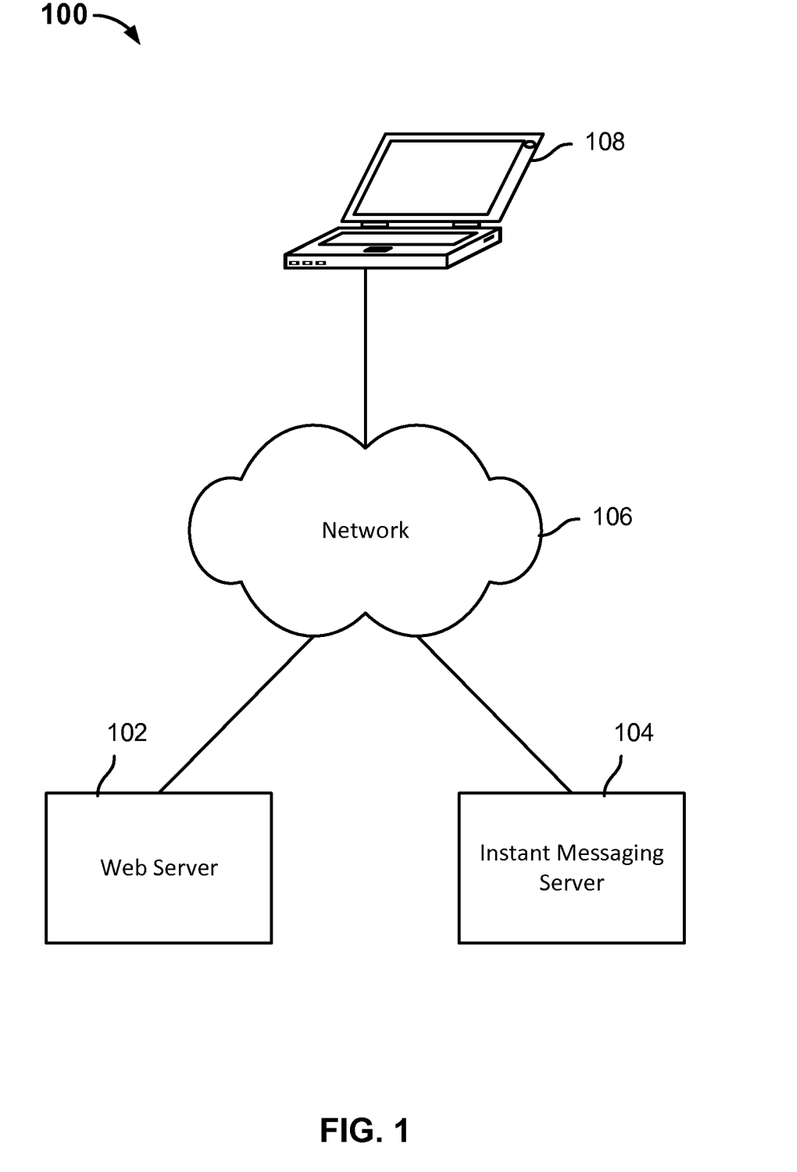
FIG. 1 is a diagram illustrating an embodiment of a system using group messaging to facilitate interactions between users.

FIG. 1 is a diagram illustrating an embodiment of a system using group messaging to facilitate interactions between users. System 100 includes a web server 102, an instant messaging server 104 and a client 108. The web server 102, the instant messaging server 104 and the client 108 are all connected together via a network 106. Although only one web server 102, one instant messaging server 104 and one client 108 are shown, more than one a web server 102, more than one instant messaging server 104 and more than one client 108 can be located on the network 106. The client 108 has a browser and can be a personal computer (PC), a mobile device, and the like. The web server 102 is a server that can deliver web pages to the client 108 upon request over HyperText Transfer Protocol (HTTP) or based on any other appropriate protocol (including any proprietary protocol) via the network 106. The instant messaging server 104 is any server that can offers an instantaneous transmission of messages between clients 108 via the network 106 over any appropriate protocol (including any proprietary protocol).

As used herein, the website may refer to a set of related web pages published on the Internet based on HyperText Mark-up Language (HTML) displaying specified content. The website can include multiple webpages displaying different content, such as a homepage, a list page, and a detail page.

Figure 2:
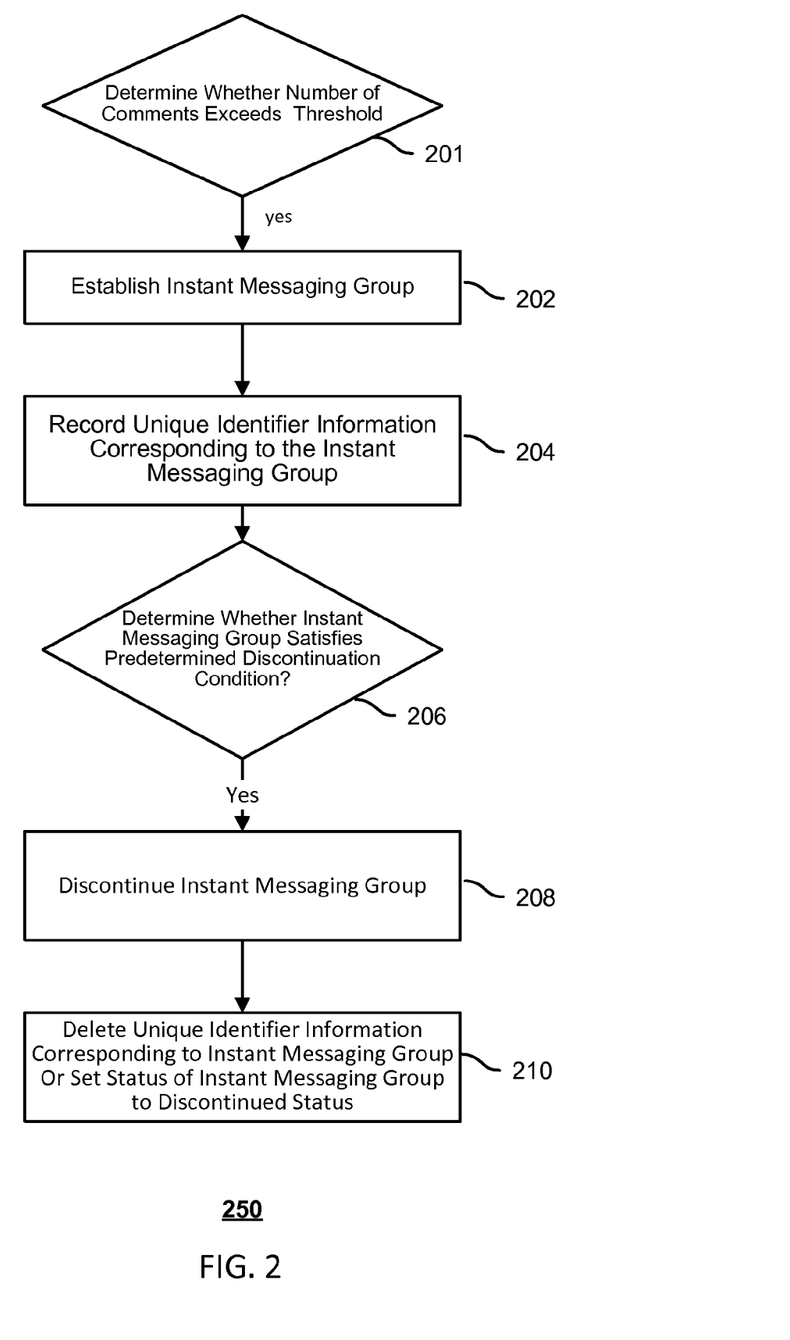
FIG. 2 is a flowchart illustrating an embodiment of a method for establishing group messaging relationships.

FIG. 2 is a flowchart illustrating an embodiment of a process for establishing group messaging relationships. Process 250 can be implemented on a web server such as the web server 102 of FIG. 1. Process 250 includes the following steps:

At 201, it is determining whether a number of comments relating to information exceeds a predetermined first numerical threshold within a predetermined first time period.

At 202, in response to the determination that the number of comments relating to information exceeds the predetermined first numerical threshold within the predetermined first time period, a corresponding instant messaging group relating to the information is established.

At 204, a unique identifier information corresponding to the instant messaging group relating to the information is recorded.

The web server may add the unique identifier information corresponding to the instant messaging group relating to the information to the information itself.

For a piece of the information (e.g., a product listing, a new item, etc.), in response to a number of comments relating to the information exceeding the first numerical predefined threshold within the predetermined first time period, for example, in response to the number of comments relating to the information exceeding 100 within one day, the web server may indicate that the information has received the interest of a relatively large number of users. Subsequently, the web server may automatically establish an instant messaging group relating to the information, and the web server may record a unique identifier information corresponding to the established instant messaging group relating to the information. In response to the web page including the information being displayed on a browser of a client, based on the recorded unique identifier information corresponding to the instant messaging group relating to the information, the web server may load portal information of the instant messaging group relating to the information onto an information web page. Thus, the web server may facilitate access to the instant messaging group by users who are interested in the information to engage in real-time exchanges.

Figure 3:
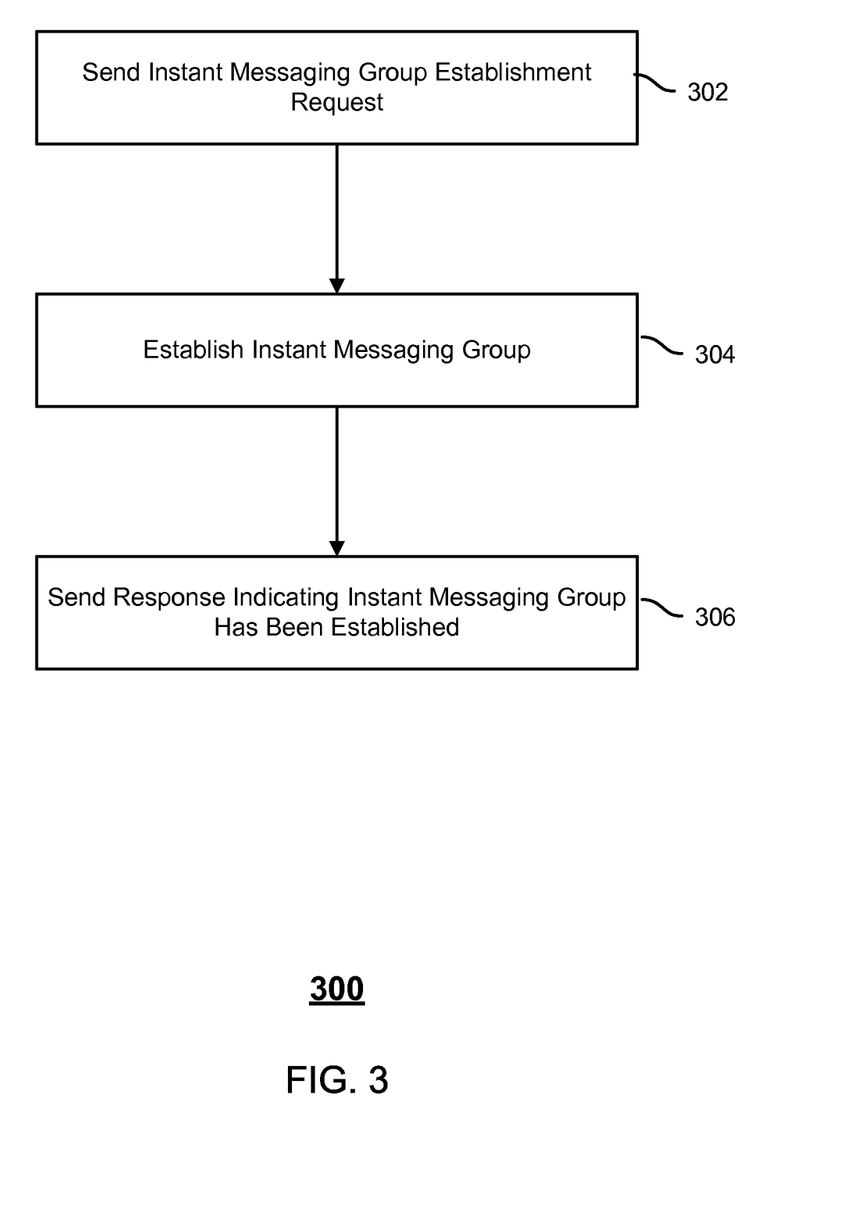
FIG. 3 is a flowchart illustrating an embodiment of a method for establishing group messaging relationships.

In an example of an implementation of step 202, the establishing of the instant messaging group relating to the information may include the following steps:

FIG. 3 is a flowchart illustrating an embodiment of a process for establishing an instant messaging group relating to a piece of information. Process 300 can be performed on a system such as the instant messaging server 104 of FIG. 1.

At 302, an instant messaging group establishment request relating to the information of interest is sent from the web server to an instant messaging server. In some embodiments, the instant messaging group establishment request includes the unique identifier information assigned to the instant messaging group. The instant messaging group establishment request can be an HTTP request or a request based on any other appropriate protocol (including any proprietary protocol).

At 304, the instant messaging server establishes an instant messaging group relating to the information, and records the unique identifier information corresponding to the established instant messaging group.

If the instant messaging group is established successfully, at 306, the instant messaging server sends a response to the web server, indicating that the instant messaging group has been successfully established. The instant messaging group establishment response can be an HTTP response or a response based on any other appropriate protocol (including any proprietary protocol).

In one example, the instant messaging group establishment request sent by the web server includes group information, which may include a group name of the instant messaging group, descriptive information, group information, and/or security authentication information. The group name does not have to be unique and can be identical to a group name registered for another group. The descriptive information may include details about the information corresponding to the instant messaging group (e.g., car lovers). The group information may also include a group administrator. The instant messaging server may establish an instant messaging group relating to the information, and assign a unique group account number corresponding to the instant messaging group. The instant messaging group establishment response sent by the instant messaging server to the web server may include the unique group account number corresponding to the instant messaging group. In this example, the group account number corresponding to the instant messaging group is the unique identifier information of the instant messaging group.

In another example, the instant messaging group establishment request relating to the information sent by the web server includes a unique group name of the instant messaging group, descriptive information, group information, and/or security authentication information. In response to the group name of the instant messaging group having already been registered to another group, the instant messaging server prompts the web server to register a different group name for the instant messaging group. Thus, the uniqueness of the group name is ensured. The group information may include a group administrator. The descriptive information may include details about the information corresponding to the instant messaging group. The instant messaging server may establish an instant messaging group relating to the information. In response to the instant messaging server establishing the instant messaging group relating to the information, the instant messaging server sends an instant messaging group establishment response to the web server. The instant messaging group establishment response may include the unique group name assigned to the instant messaging group. In some embodiments, the group name of the instant messaging group corresponds to the unique identifier information of the instant messaging group.

In order to better manage the instant messaging group relating to the information, a group administrator may be created to manage the instant messaging group. In one example, the group administrator is by default the creator/original poster of the piece of information. In another example, the group administrator of the instant messaging group relating to a particular product is by default the seller of the particular product.

In some embodiments, in response to a level of interest for a particular piece of information decreasing, the web server automatically discontinues (e.g., deletes) the instant messaging group. For example, if it is determined that no user posted messages in the instant messaging group relating to the information within a period of time, or if the number of users sending messages in the instant messaging group relating to the information falls below a predetermined threshold within a predefined time period, the instant messaging group is deleted from the instant messaging server. In some embodiments, an expiration date for the instant messaging group is set at the time the instant messaging group is established. Thus, the instant messaging group is discontinued by the server when the expiration date is reached.

Returning to FIG. 2, process 200 can optionally include:

At 206, it is determined whether the instant messaging group relating to the information satisfies a predetermined discontinuation condition, At 208, in response to the determination that the instant messaging group relating to the information satisfies the predetermined discontinuation condition, discontinuing, by the web server, the instant messaging group relating to the information.

The predetermined discontinuation condition may include any combination of the following: a number of messages in the instant messaging group relating to the information in a predefined second time period being less than a predetermined second numerical threshold, a number of users posting messages in the instant messaging group relating to the information in a predefined third time period being less than a predetermined third numerical threshold, and a current date exceeding an expiration date set for the instant messaging group relating to the information.

At 210, the unique identifier information of the instant messaging group relating to the information is deleted, or a status of the instant messaging group relating to the information is set to a discontinued status.

For a piece of information, in response to a number of messages in the instant messaging group relating to the piece of information being less than a predefined number within a predetermined time period, in response to a number of users posting messages in the instant messaging group relating to the information are below a predetermined numerical threshold within a predetermined time period, or any combination thereof, the web server may automatically discontinue the instant messaging group relating to the piece of information.

The discontinuation of the instant messaging group may include deleting the unique identifier information of the instant messaging group or setting a status of the instant messaging group to a discontinued status. For example, in response to the instant messaging group having five messages within a ten day period, or in response to fewer than three users posting messages in the instant messaging group within a ten day period, the web server may automatically discontinue the instant messaging group relating to the piece of information. The relatively small number of messages posted in the group or the relatively small number of users posting in the group may indicate that the level of user interest in the information has decreased. Subsequently, the loading of the portal information of the instant messaging group relating to the information may no longer be necessary in response to the information web page being displayed on the browser of the client.

In an example of step 208, the discontinuing of the instant messaging group relating to the information may include the following:

The web server may send an instant messaging group discontinuation request to the instant messaging server. The instant messaging group discontinuation request may include the unique identifier information of the instant messaging group. The instant messaging group discontinuation request may be an HTTP request or sent over another networking protocol.

The web server may receive an instant messaging group discontinuation response from the instant messaging server. The instant messaging group discontinuation response may be sent over HTTP or another networking protocol.

Figure 4:
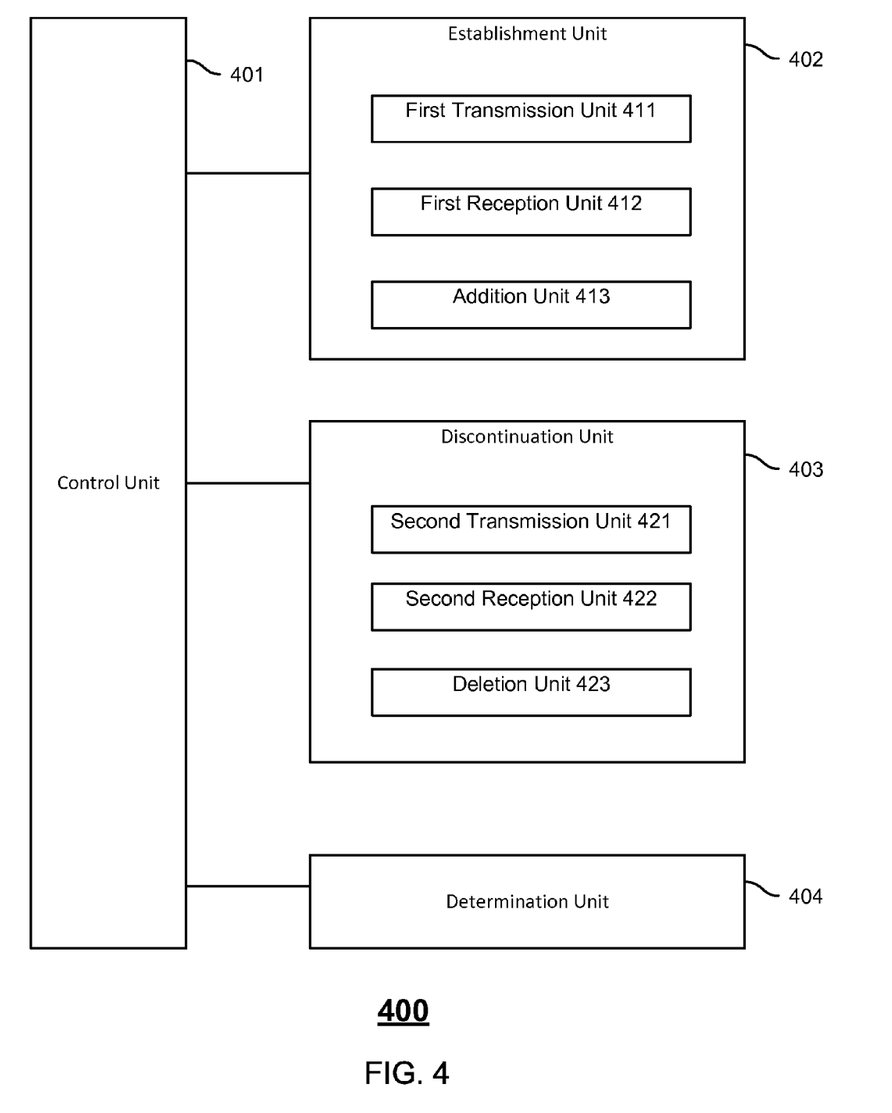
FIG. 4 is a structural block diagram illustrating an embodiment of a web server for establishing group messaging relationships.

The present application discloses a web server for establishing group messaging relationships corresponding to the method for establishing group messaging relationships described above. Because the principles of the web server are similar to the method of establishing group messaging relationships, the web server may be implemented referring to the method for establishing group messaging relationships. Accordingly, areas of repetition will not be further discussed for conciseness. FIG. 4 is a diagram illustrating an embodiment of a web server for establishing group messaging relationships. Referring to FIG. 4, web server 400 includes a control unit 401, an establishment unit 402 and a determination unit 404.

The determination unit 404 is configured to determine whether a number of comments relating to a piece of information exceeds a predetermined first numerical threshold within a predefined first time period.

The control unit 401 is configured to activate the establishment unit 402 in response to the number of comments relating to the piece of information exceeding the predetermined first numerical threshold within the predefined first time period.

The establishment unit 402 is configured to establish an instant messaging group relating to the piece of information, and record a unique identifier information corresponding to the instant messaging group relating to the information.

For example, the establishment unit 402 may include:

A first transmission unit 411 configured to send an instant messaging group establishment request relating to the information to an instant messaging server. The instant messaging group establishment request may include the unique identifier information corresponding to the instant messaging group. The instant messaging group establishment request may be an HTTP request or sent over another networking protocol.

A first reception unit 412 configured to receive an instant messaging group establishment response sent by the instant messaging server after establishing the instant messaging group relating to the information. The instant messaging group establishment response may be sent by the instant messaging server in response to the instant message server establishing the instant messaging group. The instant messaging group establishment response may be sent over HTTP or another networking protocol.

An addition unit 413 configured to record the unique identifier information corresponding to the instant messaging group based on the instant messaging group establishment response received by the first reception unit 412.

In the embodiment illustrated in FIG. 4 the web server 400 may include a discontinuation unit 403.

The control unit 401 may activate the discontinuation unit 403 in response to the instant messaging group relating to the information satisfying a predetermined discontinuation condition.

The discontinuation unit 403 may be configured to discontinue the instant messaging group relating to the information. The discontinuation unit 403 may delete the unique identifier information corresponding to the instant messaging group relating to the information or set a status of the instant messaging group relating to the information to a discontinued status.

In one example, the predetermined discontinuation condition may include any combination of the following:

The determination unit 404 determining a number of messages in the instant messaging group relating to the information within a predefined second time period is less than a predetermined second numerical threshold.

The determination unit 404 determining a number of users posting messages in the instant messaging group relating to the information within a predefined third time period is less than a predetermined third numerical threshold.

The determination unit 404 determining a current time exceeds an expiration date of the instant messaging group relating to the information. The expiration date may be set at the same time the instant messaging group is established.

In another example, the discontinuation unit 403 may include the following:

A second transmission unit 421 configured to send an instant messaging group discontinuation request to the instant messaging server. The instant messaging group discontinuation request may include the unique identifier information of the instant messaging group relating to the information. The instant messaging group discontinuation request may be an HTTP request or sent over another networking protocol.

A second reception unit 422 configured to receive an instant messaging group discontinuation response sent by the instant messaging server. The instant messaging server may send the instant messaging group discontinuation response in response to the instant messaging group receiving the instant messaging group discontinuation request. The instant messaging group discontinuation response may be sent over HTTP or another networking protocol.

A deletion unit 423 configured to in response to the second reception unit 422 receiving the instant messaging group discontinuation response, delete the unique identifier information of the instant messaging group relating to the information or set a status of the instant messaging group relating to the information to a discontinued status.

With the group messaging relationship establishment method and related equipment disclosed in the embodiments of the present application, for one piece of information, in response to the one piece of information attracting the interest of a relatively large number of users, the web server may automatically establish an instant messaging group relating to the piece of information. By establishing a relationship between comments and an instant messaging utility, the above methods and related equipment enable a convenient and quick establishment of group messaging among the users who are interested in the same piece of information. In facilitating real-time exchanges among users interested in the same piece of information, the above methods and equipment also reduce the utilization of server resources and the load on the communications network.

Furthermore, in response to the level of interest for the information decreasing, the instant messaging group created corresponding to the information may automatically be discontinued by the web server. Thus, the discontinuation may also further reduce the utilization of server resources and the load on the communications network.

Figure 5:
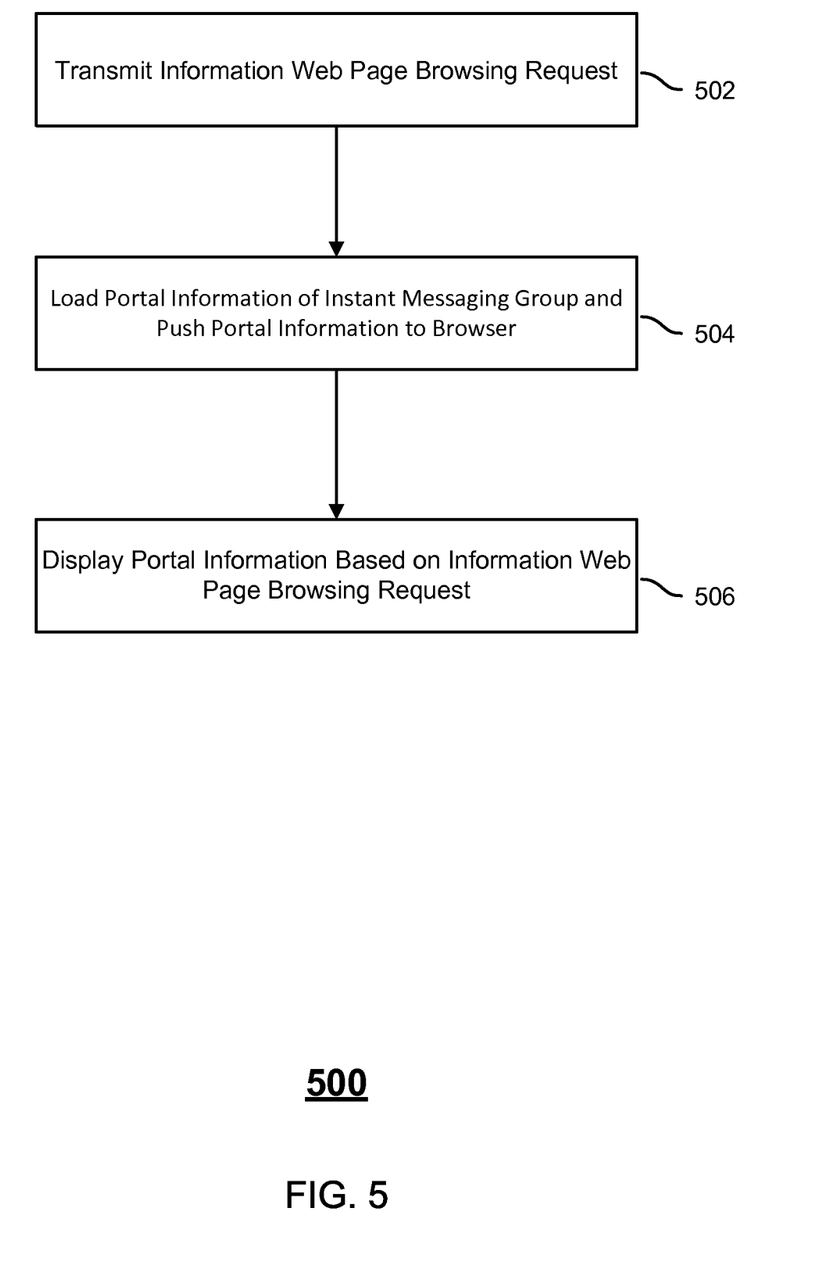
FIG. 5 is a flowchart illustrating an embodiment of a web page display method for establishing group messaging relationships.

FIG. 5 is a flowchart illustrating an embodiment of a process of displaying a web page used for establishing group messaging relationships. Based on the establishment of group messaging relationships, FIG. 5 illustrates the web page display method. The web page display method 500 includes the following steps.

As described below, a user may browse the information web page displayed on the browser of the client, and review the comments of other users on the information web page. Portal information of the instant messaging group relating to the information may be loaded on an information web page. Thus, when the user initiating a real-time exchange with other users interested in the same information, the user can access the instant messaging group based on the unique identifier information of the instant messaging group by clicking on an instant messaging group portal.

In 502, an information web page browsing request is sent by a user via a browser (or other appropriate application) to a web server. The information web page browsing request may include a unique identifier information of an instant messaging group relating to information.

In one example, the information web page browsing request sent by the browser of the client is a browsing request for a detailed web page of the website. Users may enter a URL (Uniform Resource Locator) for the information web page in the browser of the client to activate a transmission of an information web page browsing request by the browser of the client, or click on a list page that includes a hyperlink to the information web page in an to activate the transmission of the information web page browsing request.

In 504, an response to the web server receiving the information web page browsing request, based on the unique identifier information included in the information web page browsing request, portal information of the instant messaging group relating to the information is loaded into an information web page to be displayed on a client.

In 506, the browser (or other application) of the client displays the portal information of the instant messaging group relating to the information sent by the web server based on the unique identifier information of the information web page browsing request.

In some embodiments, the portal information of the instant messaging group includes a hyperlink generated based on the unique identifier information of the instant messaging group. Additional information such as an image of a logo of an instant messaging utility can be optionally included. In some embodiments, instant messaging group portals are displayed on an information web page as an image of the logo of the instant messaging utility.

In response to the user clicking on an instant messaging group portal (e.g., the logo for the instant messaging utility), the user invokes the instant messaging utility, and is permitted to communicate with and otherwise access the instant messaging group by utilizing the unique identifier information of the instant messing group upon the user logging into the instant messaging utility. Also, in response to the user not being logged into the instant messaging utility, a login page for the instant messaging utility may first appear on the information web page. In response to the user successfully logging into the instant messaging utility, the instant messaging group may be accessed automatically by utilizing the unique identifier information of the instant messaging group.

In one example, in response to the user already being logged into the instant messaging utility at the time the user clicks the instant messaging group portal, the browser of the client may transmit the unique identifier information of the instant messaging group to the instant messaging client, and the instant messaging client may displays an instant messaging (IM) window of the instant messaging group based on the unique identifier information of the instant messaging group.

In another example, in response to the user not being logged onto the instant messaging utility at the time the user clicks the instant messaging group portal, the browser of the client may first activate the instant messaging client via the operating system, a login interface of the instant messaging utility may be displayed, in response to the user successfully logging in by entering a group name or a group account number and password, the browser of the client may then transmit the unique identifier information of the instant messaging group to the instant messaging client, and the instant messaging client may display the IM window of the instant messaging group based on the unique identifier information of the instant messaging group. The password is used to log onto the instant messaging client, so that the user can use the instant messaging client interface to view the messages in the instant messaging group. As another aspect, the instant messaging server may offer an anonymous login function for the instant messaging group relating to the information. In other words, the instant messaging server may permit users of the instant messaging group to send messages anonymously in the instant messaging group.

In response to the user accessing the instant messaging group relating to the information, the user may initiate a real-time exchange with other users in the instant messaging group relating to the information. For example, the user may answer questions from other users, ask questions about the information to the other user, or even make friends with the other users. In some embodiments, the users in the IM group include users who have provided comments relating to the information and users who are interested in the information. In other words, there is no limitation in gaining access to the group. In some embodiments, the users in the IM group are limited to only the users who have provided comments relating to the information.

Figure 6:
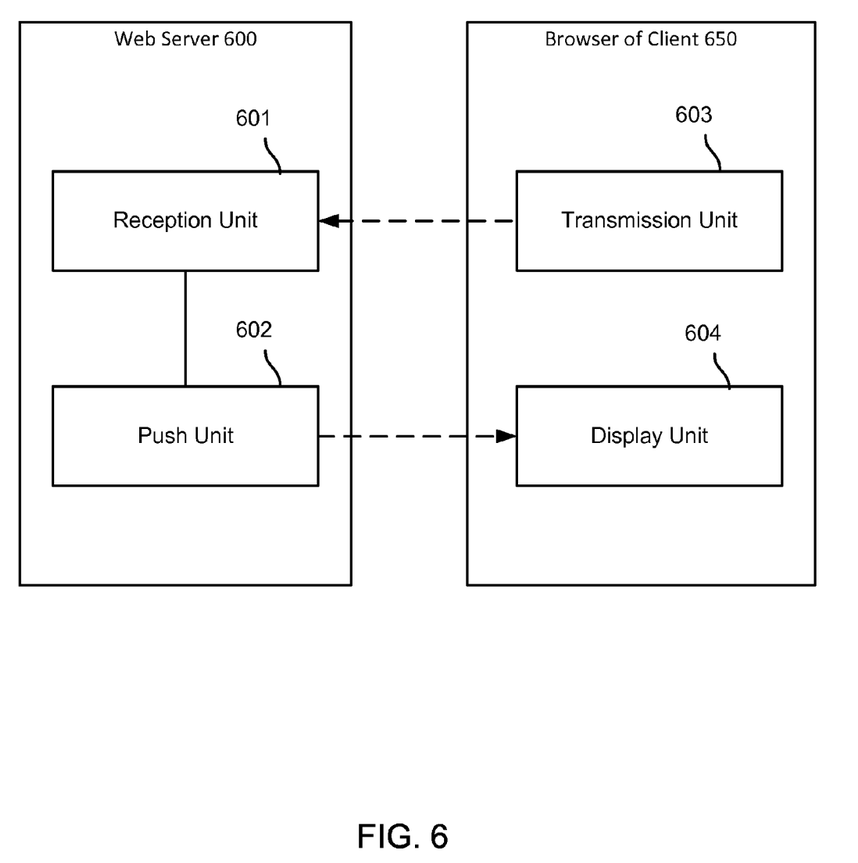
FIG. 6 is a structural block diagram illustrating a web server and a browser of a client for establishing group messaging relationships.

FIG. 6 is a structural block diagram illustrating a web server and a browser of a client for establishing group messaging relationships.

Corresponding to the web page display method described above, the present application discloses a web server 600 and a browser of a client 650 for establishing group messaging relationships. Because problem-solving principles of the web server 600 and the browser of the client 650 are similar to those of the web page display method, the web server 600 and the browser of the client 650 may therefore be implemented with reference to the web page display method. Similar areas will not be discussed again for conciseness. Referring to FIG. 6, the web server 600 includes the following:

A reception unit 601 configured to receive an information web page browsing request transmitted by the browser of the client 650.

A push unit 602 configured to load portal information of an instant messaging group relating to information onto an information web page based on a unique identifier information of an instant messaging group relating to the information, and push the information web page to the browser of the client 650 for display.

The browser of the client 650 includes the following:

A transmission unit 603 configured to transmit the information web page browsing request to the web server 600.

A display unit 604 configured to display the portal information loaded onto the information web page of the instant messaging group relating to the information based on the information web page browsing request. The portal information may be loaded onto the information web page by the web server based on the unique identifier information corresponding to the instant messaging group relating to the information.

In the embodiments of the web page display method and related equipment of the present application, for a piece of information to be viewed, in response to the browser of the client 650 transmitting an information web page browsing request to the web server, the web server 400 loads portal information of the instant messaging group relating to the information onto an information web page based on a unique identifier information of the instant messaging group relating to the information, and pushes the information web page onto the browser of the client 650 for display. By loading the portal information of the instant messaging group into the information web page, real-time exchanges among multiple users interested in the information are facilitated, reducing the utilization of server resources and the load on the communications network.

In the web page display method and related equipment disclosed in the embodiments of the present invention, by targeting information in which the user is interested in while accessing a website, the user is not only able to view the historical comments of other users, but the user may also access an instant messaging group relating to the targeted information to engage in real-time exchanges with other users. Thus, the user experience may be greatly improved. Accordingly, user loyalty to the website may be increased.

The units described above can be implemented as software components executing on one or more processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, networking equipment, etc.) implement the methods described in the embodiments of the present invention. The units may be implemented on a single device or distributed across multiple devices. The functions of the units may be merged into one another or further split into multiple sub-units.

A person of ordinary skill in the art should understand that the embodiments of the present application may be provided as methods, equipment (devices), or computer program products. Therefore, the present application may take the form of embodiments consisting entirely of hardware, embodiments consisting entirely of software, or embodiments which combine software and hardware. In addition, the present application may take the form of computer program products implemented on one or more computer-operable storage media (including but not limited to magnetic disk storage devices, CD-ROMs, and optical storage devices) containing computer operable program codes.

The present application is described with reference to flow charts and/or block diagrams based on methods, equipment (devices) and computer program products. It should be understood that each process and/or block in the flow charts and/or block diagrams, and combinations of processes and/or blocks in the flow charts and/or block diagrams, may be achieved through computer program commands. One may provide these computer commands to a general-purpose computer, a specialized computer, an embedded processor or the processor of other programmable data equipment so as to give rise to a machine, with the result that the commands executed through the computer or processor of other programmable data equipment give rise to a device that is used to implement the functions designated by one or more processes in a flow chart and/or one or more blocks in a block diagram.

These computer program commands may also be stored on specially-operating computer-readable storage devices that may guide computers or other programmable data equipment, with the result that the commands stored on these computer-readable devices give rise to products that include command devices. These command devices implement the functions designated in one or more processes in a flow chart and/or one or more blocks in a block diagram.

These computer program commands may also be loaded onto a computer or other programmable data processing equipment, with the result that a series of operating steps are executed on a computer or other programmable equipment so as to give rise to computer processing. In this way, the commands executed on a computer or other programmable equipment provide steps for implementing the functions designated by one or more processes in a flow chart and/or one or more blocks in a block diagram.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for establishing group messaging relationships, the method comprising:
    determining, by a web server, whether a number of comments relating to a piece of information exceeds a predetermined first numerical threshold within a predefined first time period;
    in the event that the number of comments relating to the information exceeds the predetermined first numerical threshold within the predefined first time period:
        establishing a corresponding instant messaging group relating to the information; and
        recording a unique identifier information for the instant messaging group relating to the information;
    receiving, by the web server, an information web page browsing request sent by a browser of a client, the information web page browsing request including the unique identifier information; and
    pushing portal information of the instant messaging group loaded onto an information web page to the browser of the client for display, the portal information of the instant messaging group relating to the unique identifier information.

2. A method as described in claim 1, wherein the establishing of the corresponding instant messaging group comprises:
    sending, by the web server, an instant messaging group establishment request to establish an instant messaging group relating to the information to an instant messaging server; and
    receiving an instant messaging group establishment response sent from the instant messaging server in response to the instant messaging server establishing the instant messaging group relating to the information based on the instant messaging group establishment request.

3. A method as described in claim 1 further comprising:
    determining, by the web server, whether the instant messaging group relating to the information satisfies a predetermined discontinuation condition;
    in response to the instant messaging group relating to the information satisfying the predetermined discontinuation condition, performing the following steps:
        discontinuing, by the web server, the instant messaging group relating to the information; and
        deleting the recorded unique identifier information for the instant messaging group relating to the information or setting a status of the instant messaging group relating to the information to a discontinued status.

4. A method as described in claim 3, wherein the predetermined discontinuation condition comprises:
    a number of messages posted in the instant messaging group relating to the information within a predefined second time period is less than a predetermined second numerical threshold,
    a number of users sending messages in the instant messaging group relating to the information within a predefined third time period is less than a predetermined third numerical threshold,
    an expiration date of the instant messaging group relating to the information is earlier than the current date, or
    any combination thereof.

5. A method as described in claim 3, wherein the discontinuing of the instant messaging group relating to the information comprises:
    sending, by the web server, an instant messaging group discontinuation request to the instant messaging server, the instant messaging group discontinuation request including the unique identifier information of the instant messaging group relating to the information; and
    receiving an instant messaging group discontinuation response sent by the instant messaging server in response to the instant messaging server discontinuing the instant messaging group.

6. A web server, the web server comprising:
    a control unit;
    a determination unit; and
    an establishment unit, wherein:
        the determination unit determines whether a number of comments relating to information exceeding a predetermined first numerical threshold within a predetermined first time period;
        the control unit activates the establishment unit in response to the determination unit determining the comments relating to the information exceeds the predetermined first numerical threshold within the predetermined first time period; and
        the establishment unit
            establishes a corresponding instant messaging group relating to the information and records a unique identifier information corresponding to the instant messaging group relating to the information,
            receives an information web page browsing request sent by a browser of a client, the information web page browsing request including the unique identifier information, and pushes portal information of the instant messaging group loaded onto an information web page to the browser of the client for display, the portal information of the instant messaging group relating to the unique identifier information.

7. A web server as described in claim 6, wherein the establishment unit comprises:
  a first transmission unit configured to send an instant messaging group establishment request relating to the information to an instant messaging server;
  a first reception unit configured to receive an instant messaging group establishment response sent by the instant messaging server in response to the instant messaging server establishing the instant messaging group relating to the information, the instant messaging group establishment response including the unique identifier information corresponding to the instant messaging group; and
  an addition unit configured to record the unique identifier information corresponding to the instant messaging group relating to the information based on the instant messaging group establishment response received by the first reception unit.

8. A web server as described in claim 6 further comprising:
  a discontinuation unit configured to discontinue the instant messaging group relating to the information, and delete the unique identifier information of the instant messaging group relating to the information or set a status of the instant messaging group relating to the information to a discontinued status,
  wherein:
    the determination unit determines whether the instant messaging group relating to the information has satisfied a predetermined discontinuation condition; and
    the control unit activates the discontinuation unit in response to the determination unit determining the instant messaging group relating to the information satisfies the predetermined discontinuation condition.

9. A web server as described in claim 8, wherein the control unit activates the discontinuation unit in response to any combination of the following conditions being satisfied:
  a number of messages in the instant messaging group relating to the information within a predefined second time period is less than a predetermined second numerical threshold,
  a number of users sending messages in the instant messaging group relating to the information within a predefined third time period is less than a predetermined third numerical threshold, and
  an expiration date set of the instant messaging group relating to the information is earlier than a current date.

10. A web server as described in claim 8, the discontinuation unit comprising:
  a second transmission unit configured to send a instant messaging group discontinuation request to the instant messaging server, the instant messaging group discontinuation request including the unique identifier information corresponding to the instant messaging group relating to the information;
  a second reception unit configured to receive an instant messaging group discontinuation response sent by the instant messaging server in response to the instant messaging server receiving the instant messaging group discontinuation request; and
  a deletion unit configured to delete the unique identifier information corresponding to the instant messaging group relating to the information or set a status of the instant messaging group relating to the information to a discontinued status.

11. A computer program product for establishing group messaging relationships, the computer product being embodied in a non-transitory computer readable medium and comprising computer instructions for:
  determining, by a web server, whether a number of comments relating to information exceeds a predetermined first numerical threshold within a predefined first time period;
  in response to the number of comments relating to the information exceeding the predetermined first numerical threshold within the predefined first time period, establishing a corresponding instant messaging group relating to the information; and
  recording a unique identifier information for the instant messaging group relating to the information;
  receiving, by the web server, an information web page browsing request sent by a browser of a client, the information web page browsing request including the unique identifier information; and
  pushing portal information of the instant messaging group loaded onto an information web page to the browser of the client for display, the portal information of the instant messaging group relating to the unique identifier information.

12. A computer program product as described in claim 11, wherein the establishing of the corresponding instant messaging group comprises:
  sending, by the web server, an instant messaging group establishment request to establish an instant messaging group relating to the information to an instant messaging server; and
  receiving an instant messaging group establishment response sent from the instant messaging server in response to the instant messaging server establishing the instant messaging group relating to the information based on the instant messaging group establishment request.

13. A computer program product as described in claim 11 further comprising:
  determining, by the web server, whether the instant messaging group relating to the information satisfies a predetermined discontinuation condition;
  in response to the instant messaging group relating to the information satisfying the predetermined discontinuation condition, performing the following steps:
    discontinuing, by the web server, the instant messaging group relating to the information; and
    deleting the recorded unique identifier information for the instant messaging group relating to the information or setting a status of the instant messaging group relating to the information to a discontinued status.

14. A computer program product as described in claim 13, wherein the predetermined discontinuation condition comprises:
  a number of messages posted in the instant messaging group relating to the information within a predefined second time period is less than a predetermined second numerical threshold,
  a number of users sending messages in the instant messaging group relating to the information within a predefined third time period is less than a predetermined third numerical threshold, an expiration date of the instant messaging group relating to the information is earlier than the current date, or any combination thereof.

15. A computer program product as described in claim 13, wherein the discontinuing of the instant messaging group relating to the information comprises:
sending, by the web server, an instant messaging group discontinuation request to the instant messaging server, the instant messaging group discontinuation request including the unique identifier information of the instant messaging group relating to the information; and
receiving an instant messaging group discontinuation response sent by the instant messaging server in response to the instant messaging server discontinuing the instant messaging group.

* * * * *